United States Patent Office 3,639,414
Patented Feb. 1, 1972

3,639,414
1-[2 - (2-SUBSTITUTED - 3 - INDOLYL)ETHYL]-4-SUBSTITUTED-PIPERIDINES AND 4 - SUBSTITUTED-1,2,5,6-TETRAHYDROPYRIDINES
Sydney Archer, Bethlehem, N.Y., assignor to Sterling Drug Inc., New York, N.Y.
No Drawing. Continuation-in-part of application Ser. No. 732,250, May 31, 1968, which is a continuation-in-part of application Ser. No. 634,899, May 1, 1967, both now abandoned. This application Sept. 16, 1969, Ser. No. 858,500
Int. Cl. C07d 31/42
U.S. Cl. 260—295 B
3 Claims

ABSTRACT OF THE DISCLOSURE

Novel 1-[2-(2-substituted - 3 - indolyl)ethyl]-4-substituted piperidines and 4-substituted-1,2,5,6-tetrahydropyridines having psychomotor depressant activity.

This application is a continuation-in-part of my prior co-pending application Ser. No. 733,250, filed May 31, 1968, which in turn is a continuation-in-part of my prior application Ser. No. 634,899, filed May 1, 1967, both now abandoned.

The present invention relates to 1-[2-(2-substituted-3 - indolyl)ethyl]-4-substituted-piperidines, and -4-substituted-1,2,5,6-tetrahydropyridines having the formula:

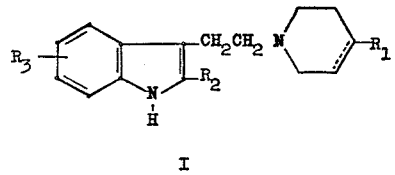

I where $R_1$ is phenyl or phenyl-lower-alkyl; $R_2$ is carbo-lower-alkoxy, carboxy, hydroxymethyl, lower-alkanoyl-oxymethyl, carbamyl, N-lower-alkylcarbamyl, N,N-di-lower-alkylcarbamyl, formyl, or isonitrosomethylene (CH=NOH), and alkali metal salts of compounds where $R_2$ is carboxy; and $R_3$ is hydrogen or methylenedioxy or ethylenedioxy attached to adjacent carbon atoms, or one or two of the same or different members of the group consisting of halogen, lower-alkyl, lower-alkoxy, lower-alkylmercapto, lower-alkylsulfinyl, lower-alkylsulfonyl, trifluoromethyl, benzyloxy, or hydroxy, and wherein the bond represented by the dotted and solid lines together is either a saturated ethylene linkage (—CH₂CH₂—)

or an unsaturated ethenylene linkage (—CH=CH—), and wherein the benzene ring of $R_1$ as phenyl or phenyl-lower-alkyl is unsubstituted or substituted by methylenedioxy or ethylenedioxy attached to adjacent carbon atoms or by one or two of the same or different members of the group consisting of halogen, lower-alkyl, lower-alkoxy, lower-alkylmercapto, lower-alkylsulfinyl, lower-alkylsulfonyl, trifluoromethyl, or hydroxy.

As used herein, the terms lower-alkyl, lower-alkoxy, and lower-alkanoyl mean such groups which can be either straight or branched, and which can contain from one to seven carbon atoms, and thus the lower-alkyl moiety of such lower-alkyl or lower-alkoxy groups represents, for example, methyl, ethyl, n-propyl, isopropyl, isobutyl, n-hexyl, and the like, and lower-alkanoyl represents, for example, formyl, acetyl, propionyl, α-methylhexanoyl, and the like.

As used herein the term lower-alkenyl means lower-alkenyl which can be either straight or branched, and which can contain from three to seven carbon atoms, and thus represents 1,3-(1-propenyl), 1,3-(1-butenyl), 1,4-(2-butenyl), and the like.

In the above general Formula I, when $R_1$ as phenyl or phenyl-lower-alkyl is substituted in the benzene ring by one or two of the substituents enumerated above, the substituents can be the same or different and can occupy any available carbon atom of the phenyl ring.

The compounds of Formula I where $R_2$ is carbo-lower-alkoxy are prepared by reacting a 2-carbo-lower-alkoxy-3-(2-haloethyl)indole of Formula II with an appropriate 4-substituted-piperidine or 4-substituted-1,2,5,6-tetrahydropyridine of Formula III according to the reaction:

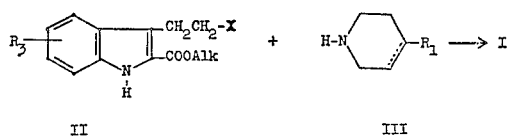

where $R_1$ and $R_3$ have the meanings given above. Alk represents lower-alkyl, and X represents halogen. The reaction can be carried out either in the absence of a solvent or in an organic solvent inert under the conditions of the reaction, for example methanol, ethanol, isopropanol, and the like, and in the presence of an acid-acceptor, the purpose of which is to take up the hydrogen halide split out during the course of the reaction. Suitable acid acceptors are alkali metal hydroxides, carbonates, or bicarbonates. An excess of the 4-substituted-piperidine or 4 - substituted-1,2,5,6-tetrahydropyridine can also be used as the acid-acceptor.

The compounds of Formula II, required as intermediates in the above reaction, are advantageously prepared by reaction of an appropriate phenylhydrazine with α-keto-δ-valerolactone, under Fischer indole synthesis conditions, and conversion of the resulting 2-carboxy-3-(2-hydroxyethyl)indole of Formula IV to the compounds of Formula II as described hereinbelow. The reactions are represented by the equations:

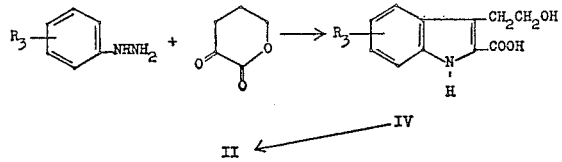

The α-keto-δ-valerolactone is in turn prepared by decarboxylation of an α-carbo-lower-alkoxalyl-δ-butyrolactone by heating the latter in the presence of sulfuric acid.

The product isolated from the Fischer indole synthesis described above generally consists of a mixture of the desired 2-carboxy-3-(2-hydroxyethyl)indole and the lactone resulting from esterification between the 2-carboxy and the 3-(2-hydroxyethyl) groups. It is therefore advantageous to reflux the crude product obtained in a lower-alkanol in the presence of excess anhydrous hydrogen halide, which results in the transformation of both Fischer indole products to the desired 2-carbo-lower-alkoxy-3-(2-haloethyl)indole of Formula II.

The 4-phenyl-1,2,5,6-tetrahydropyridines of Formula III ($R_1$ is phenyl and the dotted and solid lines together repreesnt a double bond) are advantageously prepared according to the method of Schmidle and Mansfield, J. Am. Chem. Soc., 78, 1702 (1956) in which an α-methyl-styrene is reacted with two molar equivalents of formaldehyde and one molar equivalent of ammonium chloride, and the resulting 6-methyl-6-phenyl-tetrahydro-1,3-oxazine is rearranged in aqueous methanol in the presence of concentrated hydrochloric acid. The reaction sequence, which can be carried out in a single step without isolation of the intermediate oxazine, is represented by the equations:

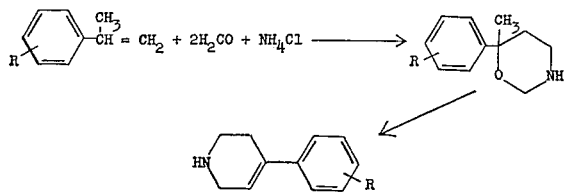

where R represents a hydrogen atom or a substituent of the nature described above.

The 4-phenyl-lower-alkyl-1,2,5,6-tetrahydropyridines of Formula III ($R_1$ is phenyl-lower-alkyl and the dotted and solid lines together represent a double bond) are advantageously prepared according to the method described by Rajsner et al., Coll. Czech. Chem. Comm., 28, 1031 (1963) in which 4-piperidone is reacted with a phenyl-lower-alkyl magnesium halide and the resulting carbinol is dehydrated with phosphorus oxychloride in pyridine. The reaction sequence is represented by the following equations:

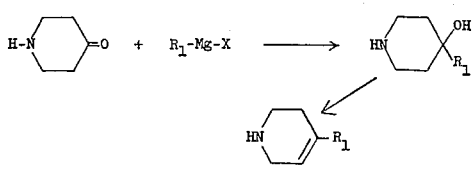

where $R_1$ represents a phenyl-lower-alkyl group, and X represents halogen.

The 4-phenyl- and 4-phenyl-lower-alkylpiperidines of Formula III, i.e. the compounds where the double bond is saturated, are prepared from the corresponding tetrahydropyridines by catalytic reduction of the latter over palladium-on-charcoal.

The compounds of Formula I where $R_2$ is carboxy are prepared by alkaline hydrolysis of the corresponding tetrahydropyridines by catalytic reduction of the latter over palladium-on-charcoal.

The compounds of Formula I where $R_2$ is carboxy are prepared by alkaline hydrolysis of the corresponding compounds where $R_2$ is carbo-lower-alkoxy. The reaction is preferably carried out either in an aqueous or an aqueous-alcoholic medium at the reflux temperature thereof in the presence of an alkali metal hydroxide. If desired, the compounds can be isolated from the alkaline reaction medium to produce the alkali metal salts of the compounds where $R_2$ is carboxy.

The compounds of Formula I where $R_2$ is carbamyl, N - lower-alkylcarbamyl, or N,N - di-lower-alkylcarbamyl, are prepared by reacting the corresponding compounds where $R_2$ is carboxy with a thionyl halide, either in the absence of a solvent or in an inert organic solvent such as benzene, toluene, or xylene, and reacting the resulting 2-haloformyl compound with, respectively, anhydrous ammonia, a lower-alkylamine [e.g. $CH_3NH_2$, $C_2H_5NH_2$, $CH_3CH_2CH_2CH(CH_3)NH_2$], or a di - lower - alkylamine [e.g. $(CH_3)_2NH$, $(C_2H_5)_2NH$, $CH_3NHC_2H_5$, $CH_3NHCH_2CH_2CH_2CH(CH_3)_2$].

The compounds of Formula I where $R_2$ is hydroxymethyl are prepared by reducing the corresponding compounds where $R_2$ is carboxy or carbo-lower-alkoxy with an alkali metal aluminum hydride. The reaction is preferably carried out in an organic solvent inert under the conditions of the reaction, for example diethyl ether, tetrahydrofuran, dibutyl ether, and the like, at temperatures in the range from 0–100° C.

The compounds of Formula I where $R_2$ is hydroxymethyl can also be prepared by alkali metal aluminum hydride reduction, as described above, of a 1-[(2-$R_2$-3-indolyl)acetyl]-4-substituted-piperidine or -4-substituted-1,2,5,6-tetrahydropyridine having the formula:

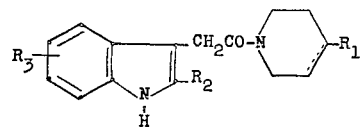

where $R_1$ and $R_3$ have the meanings given above, and $R_2$ is carbo-lower-alkoxy, carboxy, or hydroxymethyl.

The compounds of Formula I where $R_2$ is lower alkanoyloxymethyl are prepared by reacting the corresponding compounds where $R_2$ is hydroxymethyl with a lower-alkanoyl halide in an organic solvent inert under the conditions of the reaction, for example benzene, toluene, xylene, and the like, and in the presence of an acid-acceptor, for example pyridine, dimethylaniline, triethylamine, and the like. The acid-acceptor is used to take up the hydrogen halide split out during the course of the reaction.

The compounds of Formula I where $R_2$ is formyl are prepared by reducing the corresponding compounds where $R_2$ is haloformyl with tri-t-butoxy lithium aluminum hydride in an organic solvent inert under the conditions of the reaction, for example diethyl ether, dibutyl ether, or tetrahydrofuran, at temperatures in the range from 0–50° C.

The compounds of Formula I where $R_2$ is isonitrosomethylene are prepared by reacting the corresponding compounds where $R_2$ is formyl with hydroxylamine, preferably under slightly acidic conditions, and in a lower-alkanol solvent at the reflux temperature thereof.

The acid-addition salts of the bases herein described are the form in which the bases are most conveniently prepared for use. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically acceptable salts within the scope of the invention are those derived from mineral acids such as hydrobromic acid, hydriodic acid, nitric acid, phosphoric acid, sulfamic acid and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate salts, respectively.

Although pharmacologically acceptable salts are preferred, those having toxic anions are also useful. All acid-addition salts are useful intermediates as sources of the free base form even if the particular salt per se is not desired as the final product, as for example when the salts is formed only for purposes of purification or identification, or when it is used as an intermediate in preparing a pharmacologically acceptable salt by ion-exchange procedures.

Pharmacological evaluation of the compounds of Formula I according to standard pharmacological test procedures has demonstrated that they possess psychomotor depressant activity thus indicating their usefulness as tranquilizers.

Psychomotor depressant activity was determined in standard activity cages using the method of Dews, Brit. J. Pharmacol. 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active-dose. Alternatively, the $ED_{50}$, the effective dose in 50% of the animals, was determined from a dose-response curve.

Instead of determining the motor activity of the test animals using a digital counter activated by a photo-electric cell, there can also be used a counting apparatus such as described by Bonta et al., Arch. int. pharmacodyn. 129, 381–394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquilizer activity.

The compounds of the invention, when administered orally to mice in the above-described psychomotor activity test, were found to be active in the dose range of from 8 to 300 mg./kg. of body weight.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention.

EXAMPLE 1

1-[2-(2-carbethoxy-5,6-dimethoxy-3-indolyl)ethyl]-4-phenyl-1,2,5,6-tetrahydropyridine To a suspension of 23 g. (1.0 mole) of sodium pellets in 800 ml. of absolute ether was added 80 ml. of a mixture of 86 g. (1.0 mole) of γ-butyrolactone and 146 g. (1.0 mole) of ethyl oxalate. The reaction mixture began to boil gently and was allowed to reflux spontaneously for two hours, after which time the remainder of the γ-butyrolactone and ethyl oxalate mixture was added cautiously. When addition was complete, the mixture was refluxed for one hour, allowed to stand overnight, and the ether removed in vacuo. The residue was mixed with ice, acidified with cold, dilute sulfuric acid, extracted with ether, and the ether extracts dried over sodium sulfate and taken to dryness. Distillation of the residue in vacuo at 0.05 mm. afforded 98 g. of α-ethoxalyl-γ-butyrolactone, collected between 110–126° C.

Forty grams (1.215 mole) of the latter were heated under reflux in 100 ml. of 2 N sulfuric acid until the evolution of carbon dioxide ceased, giving a solution of α-keto-δ-valerolactone.

3,4-dimethoxyphenylhydrazine hydrochloride (44 g., 0.22 mole) was dissolved in 300 ml. of water, treated with a solution of 12.3 g. (0.22 mole) potassium hydroxide in 50 ml. of water, and cooled. To this mixture was added the above-described solution of α-keto-δ-valerolactone, and the pH of the mixture was adjusted to about 2 with sodium hydroxide. The mixture was warmed on a hot plate for five minutes, allowed to cool, extracted with chloroform, and the extracts dried over magnesium sulfate and concentrated to dryness giving 66 g. of crude hydrazone.

The latter was dissolved in 100 ml. of absolute ethanol, the mixture acidified with 400 ml. of saturated ethanolic hydrogen chloride, and a stream of hydrogen chloride gas was passed through the mixture causing the temperature to rise to 80° C. The solid which separated from the reaction mixture was collected after standing overnight, and washed with cold absolute ethanol to give 38 g. of crude 2-carboxy-5,6-dimethoxy-3-(2-hydroxyethyl) indole.

The latter was suspended in 300 ml. of absolute ethanol and the solution saturated with anhydrous hydrogen chloride for one hour. The mixture was allowed to stand for two hours, and the solid which separated was collected and dried to give 24 g. of 2-carbethoxy-5,6-dimethoxy-3-(2-chloroethyl)indole, M.P. 179–181° C.

The latter (16.8 g., 0.054 mole) was mixed with 18.0 g. (0.113 mole) of 4-phenyl-1,2,5,6-tetrahydropyridine and the mixture heated in an oil bath at 140–145° C. for an hour and a half. The resulting semi-solid mixture which resulted was suspended in a mixture of dilute sodium hydroxide and methylene dichloride, and the organic layer was separate, dried over anhydrous magnesium sulfate, and taken to dryness in vacuo leaving 31.7 g. of an oil. The oil was taken into methylene dichloride, the solution treated with an excess of ethereal hydrogen chloride, diluted with ether, and the solid which separated was collected (16.2 g., M.P. 241–6° C.) and set aside as a first crop. The filtrate from the first crop was taken to dryness, dissolved in 10% ethanol/benzene, and chromatographed on a column of 350 g. of silica gel, the column being eluted with 10% ethanol/benzene. The first 80 ml. of eluate was discarded, and the next 2.5 liters were retained and taken to dryness. The residue from the latter was recrystallized once from absolute ethanol and the product (2 g., M.P. 238–241° C.) was combined with the first crop of 16.2 g. The combined sample was reconverted to the free base and the latter recrystallized twice from ethyl acetate to give 11 g. of 1-[2-(2-carbethoxy - 5,6 - dimethoxy - 3 - indolyl)ethyl] - 4 - phenyl-1,2,5,6-tetrahydropyridine.

The corresponding 1 - [2 - (2 - carbethoxy - 5,6 - dimethoxy - 3 - indolyl)ethyl] - 4 - phenylpiperidine is prepared similarly by catalytic reduction of the above 4-phenyl-1,2,5,6-tetrahydropyridine with hydrogen over a palladium-on-charcoal catalyst and reaction of the product with 2 - carbethoxy-5,6-dimethoxy-3-(2-chloroethyl) indole using the procedure described above.

EXAMPLE 2

By reaction of an appropriate 2-carbo-lower-alkoxy-3-(2-chloroethyl)indole with an appropriate 4-substituted-1,2,5,6 - tetrahydropyridine or 4-substituted-piperidine, using the procedure described above in Example 1, there are obtained the following compounds of Formula I:

(A) 1 - [2 - (2 - carbethoxy - 5,6 - dimethoxy - 3-indolyl)ethyl] - 4 - (2 - methoxyphenyl) - 1,2,5,6 - tetrahydropyridine is prepared from 4-(2-methoxyphenyl)-1, 2,5,6 - tetrahydropyridine and 2 - carbethoxy - 5,6 - dimethoxy - 3 - (2 - chloroethyl)indole, the latter being prepared by reaction of 3,4-dimethoxyphenylhydrazine with α-keto-δ-valerolactone and reaction of the resulting crude product with ethanolic hydrogen chloride according to the procedure described above in Example 1. The 4-(2-methoxyphenyl) - 1,2,5,6 - tetrahydropyridine is prepared by reaction of 2-methoxy - α - methylstyrene with two molar equivalents of formaldehyde and one molar equivalent of ammonium chloride and rearrangement of the resulting oxazine with concentrated hydrochloric acid.

The corresponding 1 - [2 - (2 - carbethoxy - 5,6 - dimethoxy - 3 - indolyl)ethyl] - 4 - (2 - methoxyphenyl)piperidine is prepared similarly by catalytic reduction of the above 4-(2-methoxyphenyl) - 1,2,5,6-tetrahydropyridine with hydrogen over a palladium-on-charcoal catalyst and reaction of the product with 2-carbethoxy-5,6-dimethoxy-3-(2-chloroethyl)indole.

(B) 1 - [2 - (2 - carbethoxy - 5 - ethoxy - 6 - methoxy - 3 - indolyl) - ethyl] - 4 -(4 - methoxyphenyl) - 1,2,5,6-tetrahydropyridine is prepared from 4-(4-methoxyphenyl) - 1,2,5,6 - tetrahydropyridine and 2-carbethoxy-5-ethoxy - 6 - methoxy - 3 - (2 chloroethyl)indole, the latter being prepared by reaction of 3-methoxy-4-ethoxyphenylhydrazine with α-keto-δ-valerolactone and reaction of the crude product with ethanolic hydrogen chloride according to the procedure described above in Example 1. The 4-(4-methoxyphenyl) - 1,2,5,6-tetrahydropyridine is prepared by reaction of 4-methoxy - α - methylstyrene with two molar equivalents of formaldehyde and one molar equivalent of ammonium chloride and rearrangement of the resulting oxazine with concentrated hydrochloric acid.

The corresponding 1 - [2 - (2 - carbethoxy - 5 - ethoxy - 6 - methoxy - 3 - indolyl)ethyl] - 4 - (4 - methoxyphenyl)piperidine is prepared similarly by catalytic reduction of the above 4-(4-methoxyphenyl) - 1,2,5,6 - tetrahydropyridine with hydrogen over a palladium - on - charcoal catalyst and reaction of the product with 2-carbethoxy-5-ethoxy-6-methoxy-3-(2-chloroethyl)indole.

(C) 1 - [2 - (2 - carbethoxy - 4 - methoxy - 3 - indolyl)ethyl] - 4 - (4 - chlorophenyl) - 1,2,5,6 - tetrahydropyridine is prepared from 4-(4-chlorophenyl) - 1,2,5,6-tetrahydropyridine and 2 - carbethoxy - 4 - methoxy - 3-(2-chloroethyl)indole, the latter being prepared by reaction of 3 - methoxyphenylhydrazine with α - keto - δ-valerolactone and reaction of the crude product with ethanolic hydrogen chloride according to the procedure described above in Example 1. The 4 - (4 - chlorophenyl)-1,2,5,6 - tetrahydropyridine is prepared by reaction of 4-chloro-α-methylstyrene with two molar equivalents of formaldehyde and one molar equivalent of ammonium chloride and rearrangement of the resulting oxazine with concentrated hydrochloric acid.

The corresponding 1 - [2 - (2 - carbethoxy-4-methoxy-3 - indolyl)ethyl] - 4 - (4 - chlorophenyl)piperidine is prepared similarly by catalytic reduction of the above 4-(4-chlorophenyl) - 1,2,5,6 - tetrahydropyridine with hydrogen over a palladium-on-charcoal catalyst and reaction of the product with 2-carbethoxy-4-methoxy-3-(2-chloroethyl)indole.

(D) 1 - [2 - (2 - carbethoxy - 7 - methoxy - 3 - indolyl)ethyl] - 4 - (3,4 - dimethoxyphenyl) - 1,2,5,6 - tetrahydropyridine is prepared from 4 - (3,4 - dimethoxyphenyl)-1-2,5,6-tetrahydropyridine and 2-carbethoxy-7-methoxy-3-(2-chloroethyl)indole, the latter being prepared by reaction of 2-methoxyphenylhydrazine with α-keto-δ-valerolactone and reaction of the crude product with ethanolic hydrogen chloride according to the procedure described above in Example 1. The 4-(3,4-dimethoxyphenyl)-1,2,5,6 - tetrahydropyridine is prepared by reaction of 3,4-dimethoxy-α-methylstyrene with two molar equivalents of formaldehyde and one molar equivalent of ammonium chloride and rearrangement of the resulting oxazine with concentrated hydrochloric acid.

The corresponding 1 - [2 - (2 - carbethoxy - 7 - methoxy - 3 - indolyl)ethyl] - 4 - (3,4 - dimethoxyphenyl)piperidine is prepared similarly by catalytic reduction of the above 4 - (3,4 - dimethoxyphenyl) - 1,2,5,6 - tetrahydropyridine with hydrogen over a palladium-on-charcoal catalyst and reaction of the product with 2 - carbethoxy-7-methoxy-3-(2-chloroethyl)indole.

(E) 1-[2-(2-carbethoxy - 5 - methyl-3-indolyl)ethyl]-4-(2-methoxy-5-chlorophenyl) - 1,2,5,6 - tetrahydropyridine is prepared from 4-(2-methoxy-5-chlorophenyl)-1,2,5,6-tetrahydropyridine and 2 - carbethoxy-5-methyl-3-(2-chloroethyl)indole, the latter being prepared by reaction of 4-methylphenylhydrazine with α-keto-δ-valerolactone and reaction of the crude product with ethanolic hydrogen chloride according to the procedure described above in Example 1. The 4-(2-methoxy - 5 - chlorophenyl)-1,2,5,6-tetrahydropyridine is prepared by reaction of 2-methoxy-5-chloro-α-methylstyrene with two molar equivalents of formaldehyde and one molar equivalent of ammonium chloride and rearrangement of the resulting oxazine with concentrated hydrochloric acid.

The corresponding 1-[2-(2 - carbethoxy-5-methyl-3-indolyl)-ethyl]-4-(2 - methoxy-5-chlorophenyl)piperidine is prepared similarly by catalytic reduction of the above 4-(2 - methoxy-5-chlorophenyl)-1,2,5,6-tetrahydropyridine with hydrogen over a palladium-on-charcoal catalyst and reaction of the product with 2-carbethoxy-5-methyl-3-(2-chloroethyl)indole.

(F) 1-[2-(2-carbethoxy - 4 - chloro-3-indolyl)ethyl]-4-(2-methyl-3-chlorophenyl - 1,2,5,6 - tetrahydropyridine is prepared from 4-(2-methyl-3-chlorophenyl)-1,2,5,6-tetrahydropyridine and 2-carbethoxy-4-chloro-3-(2-chloroethyl)indole, the latter being prepared by reaction of 3-chlorophenylhydrazine with α-keto-δ-valerolactone and reaction of the crude product with ethanolic hydrogen chloride according to the procedure described above in Example 1. The 4-(2-methyl-3-chlorophenyl)-1,2,5,6-tetrahydropyridine is prepared by reaction of 2-methyl-3-chloro-α-methylstyrene with two molar equivalents of formaldehyde and one molar equivalent of ammonium chloride and rearrangement of the resulting oxazine with concentrated hydrochloride acid.

The corresponding 1-[2-(2-carbethoxy-4-chloro-3-indolyl)ethyl]-4-(2 - methyl - 3 - chlorophenyl)piperidine is prepared similarly by catalytic reduction of the above 4-(2-methyl-3-chlorophenyl) - 1,2,5,6 - tetrahydropyridine with hydrogen over a palladium-on-charcoal catalyst and reaction of the product with 2-carbethoxy-4-chloro-3-(2-chloroethyl)indole.

(G) 1-[2-(2-carbethoxy-5-fluoro-3-indolyl)ethyl]-4-(3-methylbenzyl)-1,2,5,6-tetrahydropyridine is prepared from 4-(3-methylbenzyl)-1,2,5,6-tetrahydropyridine and 2-carbethoxy-5-fluoro-3-(2-chloroethyl)indole, the latter being prepared by reaction of 4-fluorophenylhydrazine with α-keto-δ-valerolactone and reaction of the crude product with ethanolic hydrogen chloride according to the procedure described above in Example 1. The 4-(3-methylbenzyl)-1,2,5,6-tetrahydropyridine is prepared by reaction of 3-methylbenzyl magnesium bromide with 4-piperidone and dehydration of the resulting carbinol with phosphorus oxychloride in pyridine.

The corresponding 1-[2-(2-carbethoxy-5-fluoro-3-indolyl)ethyl]-4-(3-methylbenzyl)piperidine is prepared similarly by catalytic reduction of the above 4-(3-methylbenzyl)-1,2,5,6-tetrahydropyridine with hydrogen over a palladium-on-charcoal catalyst and reaction of the product with 2-carbethoxy-5-fluoro-3-(2-chlorophenyl)indole.

(H) 1-[2-(2-carbethoxy-5,6-methylenedioxy - 3 - indolyl)ethyl]-4-(2,6 - dimethylphenyl)-1,2,5,6-tetrahydropyridine is prepared from 4-(2,6-dimethylphenyl)-1,2,5,6-tetrahydropyridine and 2-carbethoxy-5,6-methylenedioxy-3-(2-chloroethyl)indole, the latter being prepared by reaction of 3,4-dimethoxyphenylhydrazine with α-keto-δ-valerolactone and reaction of the crude product with ethanolic hydrogen chloride according to the procedure described above in Example 1. The 4-(2,6-dimethylphenyl)-1,2,5,6-tetrahydropyridine is prepared by reaction of 2,6-dimethyl-α-methylstyrene with two molar equivalents of formaldehyde and one molar equivalent of ammonium chloride and rearrangement of the resulting oxazine with concentrated hydrochloric acid.

The corresponding 1-[2-(2-carbethoxy-5,6-methylenedioxy-3-indolyl)ethyl]-4-(2,6 - dimethylphenyl)piperidine is prepared similarly by catalytic reduction of the above 4-(2,6-dimethylphenyl)-1,2,5,6-tetrahydropyridine with hydrogen over a palladium-on-charcoal catalyst and reaction of the product with 2-carbethoxy-5,6-methylenedioxy-3-(2-chloroethyl)indole.

(I) 1-[2-(2-carbethoxy-5,6-ethylenedioxy - 3 - indolyl)-ethyl]-4-[2-(4-fluorophenyl)ethyl] - 1,2,5,6 - tetrahydropyridine is prepared from 4-[2-(4-fluorophenyl)ethyl]-1,2,5,6-tetrahydropyridine and 2-carbethoxy-5,6-ethylenedioxy-3(2-chloroethyl)indole, the latter being prepared by reaction of 3,4-ethylenedioxyphenylhydrazine with α-keto-δ-valerolactone and reaction of the crude product with ethanolic hydrogen chloride according to the procedure described above in Example 1. The 4-[2-(4-fluorophenyl)ethyl]-1,2,5,6-tetrahydropyridine is prepared by reaction of 2-(4-fluorophenyl)ethyl magnesium bromide with 4-piperidone and dehydration of the resulting carbinol with phosphorus oxychloride in pyridine.

The corresponding 1 - [2-(2-carbethoxy-5,6-ethylenedioxy-3-indolyl)ethyl]-4-[2-(4 - fluorophenyl)ethyl]piperidine is prepared similarly by catalytic reduction of the above 4-[2-(4-fluorophenyl)ethyl]-1,2,5,6-tetrahydropyridine with hydrogen over a palladium-on-charcoal catalyst and reaction of the product with 2-carbethoxy-5,6-ethylenedioxy-3-(2-chloroethyl)indole.

(J) 1-[2-(2 - carbethoxy-5-benzyloxy-3-indolyl)ethyl]-4-[2-(3-trifluoromethylphenyl)ethyl] - 1,2,5,6-tetrahydropyridine is prepared from 4-[2-(3-trifluoromethylphenyl)ethyl] - 1,2,5,6 - tetrahydropyridine and 2-carbethoxy-5-benzyloxy-3-(2-chloroethyl)indole, the latter being prepared by reaction of 4-benzyloxyphenylhydrazine with α-keto-δ-valerolactone and reaction of the crude product with ethanolic hydrogen chloride according to the procedure described above in Example 1. The 4-[2-(3-trifluoromethylphenyl)ethyl] - 1,2,5,6-tetrahydropyridine is prepared by reaction of 2 - (3-trifluoromethylphenyl)ethyl magnesium bromide with 4-piperidone and dehydration of the resulting carbinol with phosphorus oxychloride in pyridine.

The corresponding 1-[2 - (2-carbethoxy-5-benzyloxy-3-indolyl)ethyl]-4-[2-(3-trifluoromethylphenyl)ethyl]piperidine is prepared similarly by catalytic reduction of the above 4-[2-(3-trifluoromethylphenyl)ethyl]-1,2,5,6-tetrahydropyridine with hydrogen over a palladium-on-charcoal catalyst and reaction of the product with 2-carbethoxy-5-benzyloxy-3-(2-chloroethyl)indole.

(K) 1-[2-(2-carbethoxy-5-hydroxy - 3 - indolyl)ethyl]-4-(2 - methylmercaptophenyl)-1,2,5,6-tetrahydropyridine is prepared from 4-(2 - methylmercaptophenyl)-1,2,5,6-tetrahydropyridine and 2-carbethoxy-5-hydroxy-3-(2-chloroethyl)indole, the latter being prepared by reaction of 4-hydroxyphenylhydrazine with α-keto-δ-valerolactone and reaction of the crude product with ethanolic hydrogen chloride according to the procedure described above in Example 1. The 4-(2-methylmercaptophenyl)-1,2,5,6-tetrahydropyridine is prepared by reaction of 2-methylmercapto-α-methylstyrene with two molar equivalents of formaldehyde and one molar equivalent of ammonium chloride and rearrangement of the resulting oxazine with concentrated hydrochloric acid.

The corresponding 1-[2-(2-carbethoxy - 5 - hydroxy-3-indolyl)ethyl)]-4-(2-methylmercaptophenyl)piperidine is prepared similarly by catalytic reduction of the above 4-(2-methylmercaptophenyl) - 1,2,5,6 - tetrahydropyridine with hydrogen over a palladium-on-charcoal catalyst and reaction of the product with 2-carbethoxy-5-hydroxy-3-(2-chloroethyl)indole.

(L) 1-[2-(2-carbethoxy - 5-methylmercapto-3-indolyl)ethyl]-4-(4-chlorobenzyl) - 1,2,5,6 - tetrahydropyridine is prepared from 4-(4-chlorobenzyl) - 1,2,5,6 - tetrahydropyridine and 2-carbethoxy - 5 - methylmercapto - 3 - (2-chloroethyl)indole, the latter being prepared by reaction of 4-methylmercaptophenylhydrazine with α-keto-δ-valerolactone and reaction of the crude product with ethanolic hydrogen chloride according to the procedure described above in Example 1. The 4-(4-chlorobenzyl) - 1,2,5,6-tetrahydropyridine is prepared by reaction of 4-chlorobenzyl magnesium bromide with 4-piperidone and dehydration of the resulting carbinol with phosphorus oxychloride in pyridine.

The corresponding 1-[2-(2-carbethoxy - 5 - methylmercapto-3-indolyl)ethyl] - 4 - (4-chlorobenzyl)piperidine is prepared similarly by catalytic reduction of the above 4-(4-chlorobenzyl) - 1,2,5,6 - tetrahydropyridine with hydrogen over a palladium-on-charcoal catalyst and reaction of the product with 2-carbethoxy - 5 - methylmercapto-3-(2-chloroethyl)indole.

(M) 1-[2-(2-carbethoxy - 6 - chloro - 7 - methyl-3-indolyl)ethyl] - 4 - phenyl - 1,2,5,6 - tetrahydropyridine is prepared from 4-phenyl - 1,2,5,6 - tetrahydropyridine and 2-carbethoxy - 6 - chloro - 7 - methyl - 3 - (2-chloroethyl)indole, the latter being prepared by reaction of 2-methyl-3-chlorophenylhydrazine with α-keto-δ-valerolactone and reaction of the crude product with ethanolic hydrogen chloride according to the procedure described above in Example 1.

The corresponding 1-[2-(2-carbethoxy - 6 - chloro-7-methyl-3-indolyl)ethyl] - 4 - phenylpiperidine is prepared similarly by catalytic reduction of the above 4-phenyl-1,2,5,6-tetrahydropyridine with hydrogen over a palladium-on-charcoal catalyst and reaction of the product with 2-carbethoxy-6-chloro - 7 - methyl - 3 - (2-chloroethyl)indole.

(N) 1-[2-(2-carbethoxy - 3 - indolyl)ethyl] - 4 - (2-phenylethyl) - 1,2,5,6 - tetrahydropyridine is prepared from 4-(2-phenylethyl) - 1,2,5,6 - tetrahydropyridine and 2-carbethoxy - 3 - (2-chloroethyl)indole, the latter being prepared by reaction of phenylhydrazine with α-keto-δ-valerolactone and reaction of the crude product with ethanolic hydrogen chloride according to the procedure described above in Example 1. The 4-(2-phenylethyl)-1,2,5,6-tetrahydropyridine is prepared by reaction of 2-phenylethyl magnesium bromide with 4-piperidone and dehydration of the resulting carbinol with phosphorus oxychloride in pyridine.

The corresponding 1-[2-(2-carbethoxy - 3 - indolyl)ethyl] - 4 - (2-phenylethyl)piperidine is prepared similarly by catalytic reduction of the above 4-(2-phenylethyl)-1,2,5,6-tetrahydropyridine with hydrogen over a palladium-on-charcoal catalyst and reaction of the product with 2-carbethoxy-3-(2-chloroethyl)indole.

(O) 1-[2-(2-carbethoxy - 5,6 - dimethoxy - 3 - indolyl)ethyl] - 4 - benzyl - 1,2,5,6 - tetrahydropyridine is prepared from 4-benzyl - 1,2,5,6 - tetrahydropyridine and 2-carbethoxy-5,6-dimethoxy - 3 - (2-chloroethyl)indole. The 4-benzyl - 1,2,5,6 - tetrahydropyridine is prepared by reaction of benzyl magnesium bromide with 4-piperidone and dehydration of the resulting carbinol with phosphorus oxychloride in pyridine.

The corresponding 1-[2-(2-carbethoxy - 5,6 - dimethoxy-3-indolyl)ethyl] - 4 - benzylpiperidine is prepared similarly by catalytic reduction of the above 4-benzyl-1,2,5,6-tetrahydropyridine with hydrogen over a palladium-on-charcoal catalyst and reaction of the product with 2-carbethoxy - 5,6 - dimethoxy - 3 -(2-chloroethyl)indole.

(P) 1-[2-(2-carbopropoxy - 5,6 - dimethoxy - 3- indolyl)ethyl] - 4 - phenyl - 1,2,5,6 - tetrahydropyridine is prepared from 4-phenyl - 1,2,5,6 - tetrahydropyridine and 2-carbopropoxy - 5,6 - dimethoxy - 3 - (2-chloroethyl)indole, M.P. 185–186.5° C., the latter being prepared by reaction of 3,4-dimethoxyphenylhydrazine with α-keto-δ-valerolactone and reaction of the crude product with a solution of anhydrous hydrogen chloride in n-propanol according to the procedure described above in Example 1.

The corresponding 1-[2-(2-carbopropoxy - 5,6 - dimethoxy - 3 -indolyl)ethyl] - 4 - phenylpiperidine is prepared similarly by catalytic reduction of the above 4-phenyl - 1,2,5,6 - tetrahydropyridine with hydrogen over a palladium-on-charcoal catalyst and reaction of the product with 2-carbopropoxy - 5,6 - dimethoxy - 3 - (2-chloroethyl)indole.

(Q) 1-[2-(2-carbethoxy - 5,6 - dimethoxy - 3 - indolyl) ethyl] - 4 - (4-hydroxyphenyl) - 1,2,5,6-tetrahydropyridine is prepared from 4-(4-hydroxyphenyl) - 1,2,5,6 - tetrahydropyridine and 2-carbethoxy - 5,6 - dimethoxy - 3-(2-chloroethyl)indole. The 4-(4-hydroxyphenyl-1,2,5,6-tetrahydropyridine is prepared by reaction of 4-hydroxy-α-methylstyrene with two molar equivalents of formaldehyde and one molar equivalent of ammonium chloride and rearrangement of the resulting oxazine with concentrated hydrochloric acid.

The corresponding 1-[2-(2-carbethoxy - 5,6 - dimethoxy-3-indolyl)ethyl] -4-(4-hydroxyphenyl)piperidine is prepared by catalytic reduction of the above 4-(4-hydroxyphenyl)-1,2,5,6-tetrahydropyridine with hydrogen over a palladium-on-charcoal catalyst and reaction of the product with 2-carbethoxy - 5,6 - dimethoxy - 3 - (2-chloroethyl)indole.

(R) 1-[2-(2-carbethoxy - 5 - methylsulfinyl - 3 - indolyl)ethyl] - 4 - phenyl - 1,2,5,6 - tetrahydropyridine is prepared from 4-phenyl - 1,2,5,6 - tetrahydropyridine and 2-carbethoxy - 5 - methylsulfinyl - 3 - (2-chloroethyl)indole, the latter being prepared by reaction of 4-methylsulfinylphenylhydrazine with α-keto-δ-valerolactone and reaction of the crude product with ethanolic hydrogen chloride according to the procedure described above in Example 1.

The corresponding 1-[2-(2-carbethoxy - 5 - methylsulfinyl - 3 - indolyl)ethyl] - 4 - phenylpiperidine is prepared similarly by reaction of 4-phenyl - 1,2,5,6 - tetrahydropyridine with 2-carbethoxy - 5 - methylsulfinyl-3-(2-chloroethyl)indole.

(S) 1-[2-(2-carbethoxy - 5 - methylsulfonyl - 3 - indolyl)ethyl] - 4 - phenyl - 1,2,5,6 - tetrahydropyridine is sulfonylphenylhydrazine with α-keto-δ-valerolactone and 2-carbethoxy - 5 - methylsulfonyl - 3 - (2-chloroethyl) indole, the latter being prepared by reaction of 4-methylsulfonylphenylhydrazine with α-keto-δ-valerolacetone and reaction of the crude product with ethanolic hydrogen chloride according to the procedure described above in Example 1.

The corresponding 1-[2-(2-carbethoxy - 5 - methylsulfonyl - 3 - indolyl)ethyl] - 4 - phenylpiperidine is prepared similarly by reaction of 4-phenyl - 1,2,5,6 - tetrahydropyridine with 2-carbethoxy - 5 - methylsulfonyl-3-(2-chloroethyl)indole.

(T) 1-[2-(2-carbethoxy - 5 - trifluoromethyl-3-indolyl)-ethyl] - 4 - (2-methylsulfinylphenyl) - 1,2,5,6-tetrahydropyridine is prepared from 4-(4-methylsulfinylphenyl)-1,2,5,6-tetrahydropyridine and 2-carbethoxy-5-trifluoromethyl-3-(2-chloroethyl)indole, the latter being prepared by reaction of 4-trifluoromethylphenylhydrazine with α-keto-δ-valerolactone and reaction of the crude product with ethanolic hydrogen chloride according to the procedure described above in Example 1. The 4-(4-methylsulfinylphenyl)-1,2,5,6-tetrahydropyridine is prepared by reaction of 4-methylsulfinyl-α-methylstyrene with two molar equivalents of formaldehyde and one molar equivalent of ammonium chloride and rearrangement of the resulting oxazine with concentrated hydrochloric acid.

The corresponding 1-[2-(2-carbethoxy-5-trifluoromethyl-3-indolyl)ethyl]-4-(4 - methylsulfinylphenyl)piperidine is prepared similarly by catalytic reduction of the above 4-(4-methylsulfinylphenyl) - 1,2,5,6 - tetrahydropyridine with hydrogen over a palladium-on-charcoal catalyst and reaction of the product with 2-carbethoxy-5-trifluoromethyl-3-(2-chloroethyl)indole.

(U) 1-[2-(2-carbethoxy - 3 - indolyl)ethyl]-4-(4-methylsulfinylphenyl)-1,2,5,6-tetrahydropyridine is prepared from 4-(4 - methylsulfinylphenyl)-1,2,5,6-tetrahydropyridine and 2-carbethoxy-3-(2-chloroethyl)indole. The 4-(4-methylsulfinylphenyl) - 1,2,5,6 - tetrahydropyridine is prepared by reaction of 4-methylsulfinyl-α-methylstyrene with two molar equivalents of formaldehyde and one molar equivalent of ammonium chloride and rearrangement of the resulting oxazine with concentrated hydrochloric acid.

The corresponding 1 - [2 - (2-carbethoxy - 3 - indolyl) ethyl]-4-(4-methylsulfinylphenyl)piperidine is prepared similarly by catalytic reduction of the above 4-(4-methylsulfinylphenyl)-1,2,5,6-tetrahydropyridine with hydrogen over a palladium-on-charcoal catalyst and reaction of the product with 2-carbethoxy-3-(2-chloroethyl)indole.

(V) 1-[2-(2-carbomethoxy - 3 - indolyl)ethyl]-4-(3,4-methylenedioxyphenyl) - 1,2,5,6-tetrahydropyridine is prepared from 4-(3,4-methylenedioxyphenyl)-1,2,5,6-tetrahydropyridine and 2-carbomethoxy - 3 - (2-chloroethyl) indole according to the procedure described above in Example 1. The 4-(3,4-methylenedioxyphenyl)-1,2,5,6-tetrahydropyridine is prepared by reaction of 3,4-methylenedioxy-α-methylstyrene with two molar equivalents of formaldehyde and one molar equivalent of ammonium chloride and rearrangement of the resulting oxazine with concentrated hydrochloric acid.

The corresponding 1-[2-(2 - carbomethoxy-3-indolyl) ethyl] - 4 - (3,4-methylenedioxyphenyl)piperidine is prepared similarly by catalytic reduction of the above 4-(3,4-methylenedioxyphenyl) - 1,2,5,6 - tetrahydropyridine with hydrogen over a palladium-on-charcoal catalyst and reaction of the product with 2-carbomethoxy-3-(2-chloroethyl)indole.

(W) 1-[2-(2-carbethoxy - 3 - indolyl)ethyl] - 4 - (3,4-ethylenedioxyphenyl)-1,2,5,6-tetrahydropyridine is prepared from 4-(3,4-ethylenedioxyphenyl)-1,2,5,6-tetrahydropyridine and 2-carbethoxy-3-(2-chloroethyl)indole according to the procedure described above in Example 1. The 4 - (3,4-ethylenedioxyphenyl)-1,2,5,6-tetrahydropyridine is prepared by reaction of 3,4-ethylenedioxy-α-methylstyrene with two molar equivalents of formaldehyde and one molar equivalent of ammonium chloride and rearrangement of the resulting oxazine with concentrated hydrochloric acid.

The corresponding 1-[2-(2-carbethoxy - 3 - indolyl) ethyl]-4-(3,4-ethylenedioxyphenyl)piperidine is prepared by catalytic reduction of the above 4-(3,4-ethylenedioxyphenyl)-1,2,5,6-tetrahydropyridine with hydrogen over a palladium-on-charcoal catalyst and reaction of the product with 2-carbethoxy-3-(2-chloroethyl)indole.

EXAMPLE 3

1-[2-(2-carboxy - 5,6 - dimethoxy-3-indolyl)ethyl]-4-phenyl-1,2,5,6-tetrahydropyridine is prepared by heating 1-[2-(2-carbethoxy - 5,6 - dimethoxy - 3 - indolyl)ethyl]-4-phenyl-1,2,5,6-tetrahydropyridine in a solution containing excess sodium hydroxide in aqueous ethanol and isolating the product from a neutral medium.

In like manner, 1-[2-(2-carboxy-5,6-dimethoxy-3-indolyl)ethyl]-4-phenylpiperidine is prepared by alkaline saponification of 1-[2-(2-carbethoxy-5,6-dimethoxy-3-indolyl)ethyl]-4-phenylpiperidine.

EXAMPLE 4

By saponifying the compounds described above in Example 2 with aqueous ethanolic sodium hydroxide, using the procedure described above in Example 3, there can be obtained the respective compounds of Formula I below where $R_2$ in each instance is COOH:

(A) 1[2-(2-carboxy-5,6-dimethoxy-3-indolyl)ethyl]-4-(2-methoxyphenyl)-1,2,5,6-tetrahydropyridine and 1-[2-(2-carboxy-5,6-dimethoxy-3-indolyl)ethyl]-4-(2-methoxyphenyl)piperidine;
(B) 1-[2-(2-carboxy-5-ethoxy-6-methoxy-3-indolyl)-ethyl]-4-(4-methoxyphenyl)-1,2,5,6-tetrahydropyridine and 1-[2-(2-carboxy-5-ethoxy-6-methoxy-3-indolyl) ethyl]-4-(4-methoxyphenyl)piperidine;
(C) 1-[2-(2-carboxy-4-methoxy-3-indolyl)ethyl]-4-(4-chlorophenyl)-1,2,5,6-tetrahydropyridine and 1-[2-(2-carboxy-4-methoxy-3-indolyl)ethyl]-4-(4-chlorophenyl)piperidine;
(D) 1-[2-(2-carboxy-7-methoxy-3-indolyl)ethyl]-4-3,4-dimethoxyphenyl)-1,2,5,6-tetrahydropyridine and 1-[2-(2-carboxy-7-methoxy-3-indolyl)ethyl]-4-(3,4-dimethoxyphenyl)piperidine;

(E) 1-[2-(2-carboxy-5-methyl-3-indolyl)ethyl]-4-(2-methoxy-5-chlorophenyl)-1,2,5,6-tetrahydropyridine and 1-[2-(2-carboxy-5-methyl-3-indolyl)ethyl]-4-(2-methoxy-5-chlorophenyl)piperidine;

(F) 1-[2-(2-carboxy-4-chloro-3-indolyl)ethyl]-4-(2-methyl-3-chlorophenyl)-1,2,5,6-tetrahydropyridine and 1-[2-(2-carboxy-4-chloro-3-indolyl)ethyl]-4-(2-methyl-3-chlorophenyl)piperidine;

(G) 1-[2-(2-carboxy-5-fluoro-3-indolyl)ethyl]-4-(3-methylbenzyl)-1,2,5,6-tetrahydropyridine and 1-[2-(2-carboxy-5-fluoro-3-indolyl)ethyl]-4-(3-methylbenzyl)piperidine;

(H) 1-[2-(2-carboxy-5,6-methylenedioxy-3-indolyl)ethyl]-4-(2,6-dimethylphenyl)-1,2,5,6-tetrahydropyridine and 1-[2-(2-carboxy-5,6-methylenedioxy-3-indolyl)ethyl]-4-(2,6-dimethylphenyl)piperidine;

(I) 1-[2-(2-carboxy-5,6-ethylenedioxy-3-indolyl)-ethyl]-4-[2-(4-fluorophenyl)ethyl]1,2,5,6-tetrahydropyridine and 1-[2-(2-carboxy-5,6-ethylenedioxy-3-indolyl)ethyl]-4-[2,(4-fluorophenyl)ethyl]piperidine;

(J) 1-[2-(2-carboxy-5-benzyloxy-3-indolyl)ethyl]-4-[2-(3-trifluoromethylphenyl)ethyl]-1,2,5,6-tetrahydropyridine and 1-[2-(2-carboxy-5-benzyloxy-3-indolyl)ethyl]-4-[2-(3-trifluoromethylphenyl)ethyl]piperidine;

(K) 1-[2-(2-carboxy-5-hydroxy-3-indolyl)ethyl]-4-(2-methylmercaptophenyl)-1,2,5,6-tetrahydropyridine and 1-[2-(2-carboxy-5-hydroxy-3-indolyl)ethyl]-4-(2-methylmercaptophenyl)piperidine;

(L) 1-[2-(2-carboxy-5-methylmercapto-3-indolyl)ethyl]-4-(4-chlorobenzyl)-1,2,5,6-tetrahydropyridine and 1-[2-(2-carboxy-5-methylmercapto-3-indolyl)ethyl]-4-(4-chlorobenzyl)piperidine;

(M) 1-[2-(2-carboxy-6-chloro-7-methyl-3-indolyl)ethyl]-4-phenyl-1,2,5,6-tetrahydropyridine and 1-[2-(2-carboxy-6-chloro-7-methyl-3-indolyl)ethyl]-4-phenylpiperidine;

(N) 1-[2-(2-carboxy-3-indolyl)ethyl]-4-(2-phenylethyl)-1,2,5,6-tetrahydropyridine and 1-[2-(2-carboxy-3-indolyl)ethyl]-4-(2-phenylethyl)piperidine;

(O) 1-[2-(2-carboxy-5,6-dimethoxy-3-indolyl)ethyl]-4-benzyl-1,2,5,6-tetrahydropyridine and 1-[2-(2-carboxy-5,6-dimethoxy-3-indolyl)ethyl]-4-benzylpiperidine;

(P) 1-[2-(2-carboxy-5,6-dimethoxy-3-indolyl)ethyl]-4-phenyl-1,2,5,6-tetrahydropyridine and 1-[2-(2-carboxy-5,6-dimethoxy-3-indolyl)ethyl]-4-phenylpiperidine;

(Q) 1-[2-(2-carboxy-5,6-dimethoxy-3-indolyl)ethyl]-4-(4-hydroxyphenyl)-1,2,5,6-tetrahydropyridine and 1-[2-(2-carboxy-5,6-dimethoxy-3-indolyl)ethyl]-4-(4-hydroxyphenyl)piperidine;

(R) 1-[2-(2-carboxy-5-methylsulfinyl-3-indolyl)-ethyl]-4-phenyl-1,2,5,6-tetrahydropyridine and 1-[2-(2-carboxy-5-methylsulfinyl-3-indolyl)ethyl]-4-phenylpiperidine;

(S) 1-[2-(2-carboxy-5-methylsulfonyl-3-indolyl)ethyl]-4-phenyl-1,2,5,6-tetrahydropyridine and 1-[2-(2-carboxy-5-methylsulfonyl-3-indolyl)ethyl]-4-phenylpiperidine;

(T) 1-[2-(2-carboxy-5-trifluoromethyl-3-indolyl)ethyl]-4-(4-methylsulfinylphenyl)-1,2,5,6-tetrahydropyridine and 1-[2-(2-carboxy-5-trifluoromethyl-3-indolyl)ethyl]-4-(4-methylsulfinylphenyl)piperidine;

(U) 1-[2-(2-carboxy-3-indolyl)ethyl]-4-(4-methylsulfinylphenyl)-1,2,5,6-tetrahydropyridine and 1-[2-(2-carboxy-3-indolyl)ethyl]-4-(4-methylsulfinylphenyl)piperidine;

(V) 1-[2-(2-carboxy-3-indolyl)ethyl]-4-(3,4-methylenedioxyphenyl)-1,2,5,6-tetrahydropyridine and 1-[2-(2-carboxy-3-indolyl)ethyl]-4-(3,4-methylenedioxyphenyl)piperidine; and (W) 1-[2-(2-carboxy-3-indolyl)ethyl]-4-(3,4-ethylenedioxyphenyl)-1,2,5,6-tetrahydropyridine and 1-[2-(2-carboxy-3-indolyl)ethyl]-4-(3,4-ethylenedioxyphenyl)piperidine.

EXAMPLE 5

1 - [2 - (2 - hydroxymethyl - 5,6 - dimethoxy - 3 - indolyl)ethyl] - 4 - phenyl - 1,2,5,6 - tetrahydropyridine is prepared by reducing 1 - [2 - (2 - carbethoxy - 5,6 - dimethoxy - 3 - indolyl)ethyl] - 4 - phenyl - 1,2,5,6 - tetrahydropyridine with lithium aluminum hydride in tetrahydrofuran, decomposing the reaction mixture with water, and isolating the product from a neutral or basic medium.

Similarly, reduction of 1 - [2 - (2 - carbethoxy - 5,6-dimethoxy - 3 - indolyl)ethyl] - 4 - phenylpiperidine with lithium aluminum hydride affords 1 - [2 - (2 - hydroxymethyl-5,6-dimethoxy-3-indolyl)ethyl]-4-phenylpiperidine.

EXAMPLE 6

By reducing the compounds described above in Example 2 with lithium aluminum hydride, using the procedure described above in Example 5, there can be obtained the following respective compounds of Formula I where $R_2$ in each instance is $CH_2OH$:

(A) 1-[2-(2-hydroxymethyl-5,6-dimethoxy-3-indolyl)-ethyl]-4-(2-methoxyphenyl)-1,2,5,6-tetrahydropyridine and 1-[2-(2-hydroxymethyl-5,6-dimethoxy-3-indolyl)ethyl]-4-(2-methoxyphenyl)piperidine;

(B) 1-[2-(2-hydroxymethyl-5-ethoxy-6-methoxy-3-indolyl)-ethyl]-4-(4-methoxyphenyl)-1,2,5,6-tetrahydropyridine and 1-[2-(2-hydroxymethyl-5-ethoxy-6-methoxy-3-indolyl)ethyl]-4-(4-methoxyphenyl)piperidine;

(C) 1-[2-(2-hydroxymethyl-4-methoxy-3-idolyl)ethyl]-4-(4-chlorophenyl)-1,2,5,6-tetrahydropyridine and 1-[2-(2-hydroxymethyl-4-methoxy-3-indolyl)ethyl]-4-(4-chlorophenyl)piperidine;

(D) 1-[2-(2-hydroxymethyl-7-methoxy-3-indolyl)ethyl]-4-(3,4-dimethoxyphenyl)-1,2,5,6-tetrahydropyridine and 1-[2-(2-hydroxymethyl-7-methoxy-3-indolyl)ethyl]-4-(3-,4-dimethoxyphenyl)piperidine;

(E) 1-[2-(2-hydroxymethyl-5-methyl-3-indolyl)ethyl]-4-(2-methoxy-5-chlorophenyl)-1,2,5,6-tetrahydropyridine and 1-[2-(2-hydroxymethyl-5-methyl-3-indolyl)ethyl]-4-(2-methoxy-5-chlorophenyl)piperdine;

(F) 1-[2-(2-hydroxymethyl-4-chloro-3-indolyl)ethyl]-4-(2-methyl-3-chlorophenyl)-1,2,5,6-tetrahydropyridine and 1-[2-(2-hydroxymethyl-4-chloro-3-indolyl)ethyl]-4-(2-methyl-3-chlorophenyl)piperidine;

(G) 1-[2-(2-hydroxymethyl-5-fluoro-3-indolyl)ethyl]-4-(3-methylbenzyl)-1,2,5,6-tetrahydropyridine and 1-[2-(2-hydroxymethyl-5-fluoro-3-indolyl)ethyl]-4-(3-methylbenzyl)piperidine;

(H) 1-[2-(2-hydroxymethyl-5,6-methylenedioxy-3-indolyl)-ethyl]-4-(2,6-dimethylphenyl)-1,2,5,6-tetrahydropyridine and 1-[2-(2-hydroxymethyl-5,6-methylenedioxy-3-indolyl)ethyl]-4-(2,6-dimethylphenyl)piperidine;

(I) 1-[2-(2-hydroxymethyl-5,6-ethylenedioxy-3-indolyl)ethyl]-4-[2-(4-fluorophenyl)ethyl]-1,2,5,6-tetrahydropyridine and 1-[2-(2-hydroxymethyl-5,6-ethylenedioxy-3-indolyl)ethyl]-4-[2-(4-fluorophenyl)ethyl]piperidine;

(J) 1-[2-(2-hydroxymethyl-5-benzyloxy-3-indolyl)ethyl]-4-[2-(3-trifluoromethylphenyl)ethyl]-1,2,5,6-tetrahydropyridine and 1-[2-(2-hydroxymethyl-5-benzyloxy-3-indolyl)ethyl]-4-[2-(3-trifluoromethylphenyl)-ethyl]piperidine;

(K) 1-[2-(2-hydroxymethyl-5-hydroxy-3-indolyl)ethyl]-4-(2-methylmercaptophenyl)-1,2,5,6-tetrahydropyridine and 1-[2-(2-hydroxymethyl-5-hydroxy- 3-indolyl)ethyl]-4-(2-methylmercaptophenyl)
piperidine;
(L) 1-[2-(2-hydroxymethyl-5-methylmercapto-3-indolyl)
ethyl]-4-(4-chlorobenzyl)-1,2,5,6-tetrahydropyridine
and 1-[2-(2-hydroxymethyl-5-methylmercapto-3-
indolyl)ethyl]-4-(4-chlorobenzyl)piperidine;
(M) 1-[2-(2-hydroxymethyl-6-chloro-7-methyl-3-indolyl)ethyl]-4-phenyl-1,2,5,6-tetrahydropyridine and 1-[2-(2-hydroxymethyl-6-chloro-7-methyl-3-indolyl)
ethyl]-4-phenylpiperidine;
(N) 1-[2-(2-hydroxymethyl-3-indolyl)ethyl]-4-(2-phenylethyl)-1,2,5,6-tetrahydropyridine and 1-[2-2-hydroxymethyl-3-indolyl)ethyl]-4-(2-phenylethyl)piperidine;
(O) 1-[2-(2-hydroxymethyl-5,6-dimethoxy-3-indolyl)
ethyl]-4-benzyl-1,2,5,6-tetrahydropyridine and 1-[2-(2-hydroxymethyl-5,6-dimethoxy-3-indolyl)ethyl]-4-benzylpiperidine;
(P) 1-[2-(2-hydroxymethyl-5,6-dimethoxy-3-indolyl)
ethyl]-4-phenyl-1,2,5,6-tetrahydropyridine and 1-[2-(2-hydroxymethyl-5,6-dimethoxy-3-indolyl)
ethyl]-4-phenylpiperidine;
(Q) 1-[2-(2-hydroxymethyl-5,6-dimethoxy-3-indolyl)
ethyl]-4-(4-hydroxyphenyl)-1,2,5,6-tetrahydropyridine and 1-[2-(2-hydroxymethyl-5,6-dimethoxy-
(R) 1-[2-(2-hydroxymethyl-5-methylsulfinyl-3-indolyl)
ethyl]-4-phenyl-1,2,5,6-tetrahydropyridine and 1-[2-(2-hydroxymethyl-5-methylsulfinyl-3-indolyl)
ethyl]-4-phenylpiperidine;
(S) 1-[2-(2-hydroxymethyl-5-methylsulfonyl-3-indolyl)
ethyl]-4-phenyl-1,2,5,6-tetrahydropyridine and 1-[2-(2-hydroxymethyl-5-methylsulfonyl-3-indolyl)
ethyl]-4-phenylpiperidine;
(T) 1-[2-(2-hydroxymethyl-5-trifluoromethyl-3-indolyl)
ethyl]-4-(4-methylsulfinylphenyl)-1,2,5,6-tetrahydropyridine and 1-[2-(2-hydroxymethyl-5-trifluoromethyl-3-indolyl)ethyl]-4-(4-methylsulfinylphenyl)piperidine;
(U) 1-[2-(2-hydroxymethyl-3-indolyl)ethyl]-4-(4-methylsulfinylphenyl)-1,2,5,6-tetrahydropyridine and 1-[2-(2-hydroxymethyl-3-indolyl)ethyl]-4-(4-methylsulfinylphenyl)piperidine;
(V) 1-[2-(2-hydroxymethyl-3-indolyl)ethyl]-4-(3,4-methylenedioxyphenyl)-1,2,5,6-tetrahydropyridine and 1-[2-(2-hydroxymethyl-3-indolyl)ethyl]-4-(3,4-methylenedioxyphenyl)piperidine; and
(W) 1-[2-(2-hydroxymethyl-3-indolyl)ethyl]-4-(3,4-ethylenedioxyphenyl)-1,2,5,6-tetrahydropyridine and 1-[2-(2-hydroxymethyl-3-indolyl)ethyl]-4-(3,4-ethylenedioxyphenyl)piperidine.

EXAMPLE 7

1 - [2 - (2 - acetoxymethyl - 5,6 - dimethoxy-3-indolyl)
ethyl] - 4 - phenyl - 1,2,5,6 - tetrahydropyridine is prepared by reaction of 1-[2-(2-hydroxymethyl - 5,6 - dimethoxy - 3 - indolyl)ethyl] - 4 - phenyl - 1,2,5,6-tetrahydropyridine with acetyl chloride in the presence of pyridine. Similarly, reaction of 1-[2-(2-hydroxymethyl-5,6-dimethoxy - 3 - indolyl)ethyl] - 4 - phenylpiperidine with acetyl chloride in the presence of pyridine affords 1 - [2 - ( 2 acetoxymethyl - 5,6 - dimethoxy-3-indolyl)
ethyl]-4-phenylpiperidine.

EXAMPLE 8

By reaction of the compounds described above in Example 6 with acetyl chloride in the presence of pyridine, using the procedure described above in Example 7, there can be obtained the following respective compounds of Formula I where $R_2$ in each instance is $CH_2OCOCH_3$:
(A) 1-[2-(2-acetoxymethyl-5,6-dimethoxy-3-indolyl)
ethyl]-4-(2-methoxyphenyl)-1,2,5,6-tetrahydropyridine and 1-[2-(2-acetoxymethyl-5,6-dimethoxy-3-indolyl)ethyl]-4-(2-methoxyphenyl)piperidine;
(B) 1-[2-(2-acetoxymethyl-5-ethoxy-6-methoxy-3-indolyl)ethyl]-4-(4-methoxyphenyl)-1,2,5,6-tetrahydropyridine and 1-[2-(2-acetoxymethyl-5-ethoxy-6-methoxy-3-indolyl)ethyl]-4-(4-methoxyphenyl)
piperidine;
(C) 1-[2-(2-acetoxymethyl-4-methoxy-3-indolyl)
ethyl]-4-(4-chlorophenyl)-1,2,5,6-tetrahydropyridine and 1-[2-(2-acetoxymethyl-4-methoxy-3-indolyl)
ethyl]-4-(4-chlorophenyl)piperidine;
(D) 1-[2-(2-acetoxymethyl-7-methoxy-3-indolyl)
ethyl]-4-(3,4-dimethoxyphenyl)-1,2,5,6-tetrahydropyridine and 1-[2-(2-acetoxymethyl-7-methoxy-3-indolyl)ethyl]-4-(3,4-dimethoxyphenyl)piperidine;
(E) 1-[2-(2-acetoxymethyl-5-methyl-3-indolyl)
ethyl]-4-(2-methoxy-5-chlorophenyl)-1,2,5,6-tetrahydropyridine and 1-[2-(2-acetoxymethyl-5-methyl-3-indolyl)ethyl]-4-(2-methoxy-5-chlorophenyl)
piperidine;
(F) 1-[2-(2-acetoxymethyl-4-chloro-3-indolyl)ethyl]-4-(2-methyl-3-chlorophenyl)-1,2,5,6-tetrahydropyridine and 1-[2-(2-acetoxymethyl-4-chloro-3-indolyl)
ethyl]-4-(2-methyl-3-chlorophenyl)piperidine;
(G) 1-[2-(2-acetoxymethyl-5-fluoro-3-indolyl)ethyl]-4-(3-methylbenzyl)-1,2,5,6-tetrahydropyridine and 1-[2-(2-acetoxymethyl-5-fluoro-3-indolyl)ethyl]-4-(3-methylbenzyl)piperidine;
(H) 1-[2-(2-acetoxymethyl-5,6-methylenedioxy-3-indolyl)ethyl]-4-(2,6-dimethylphenyl)-1,2,5,6-tetrahydropyridine and 1 - [2-(2-acetoxymethyl-5,6-methylenedioxy-3-indolyl)ethyl]-4-(2,6-dimethylphenyl)
piperidine;
(I) 1-[2-(2-acetoxymethyl-5,6-ethylenedioxy-3-indolyl)ethyl]-4-[2-(4-fluorophenyl)ethyl]-1,2,5,6-tetrahydropyridine and 1-[2-(2-acetoxymethyl-5,6-ethylenedioxy-3-indolyl)ethyl]-4-[2-(4-fluorophenyl)
ethyl]piperidine;
(J) 1-[2-(2-acetoxymethyl-5-benzyloxy-3-indolyl)
ethyl]-4-[2-(3-trifluoromethylphenyl)ethyl]-1,2,5,6-tetrahydropyridine and 1-[2-(2-acetoxymethyl-5-benzyloxy-3-indolyl)ethyl]-4-[2-(3-trifluoromethylphenyl)ethyl]piperidine;
(K) 1-[2-(2-acetoxymethyl-5-hydroxy-3-indolyl)
ethyl]-4-(2-methylmercaptophenyl)-1,2,5,6-tetrahydropyridine and 1-[2-(2-acetoxymethyl-5-hydroxy-3-indolyl)ethyl]-4-(2-methylmercaptophenyl)
piperidine;
(L) 1-[2-(2-acetoxymethyl-5-methylmercapto-3-indolyl)ethyl]-4-(4-chlorobenzyl)-1,2,5,6-tetrahydropyridine and 1-[2-(2-acetoxymethyl-5-methylmercapto-3-indolyl)ethyl]-4-(4-chlorobenzyl)
piperidine;
(M) 1-[2-(2-acetoxymethyl-6-chloro-7-methyl-3-indolyl)ethyl]-4-phenyl-1,2,5,6-tetrahydropyridine and 1-[2-(2-acetoxymethyl-6-chloro-7-methyl-3-indolyl)ethyl]-4-phenylpiperidine;
(N) 1-[2-(2-acetoxymethyl-3-indolyl)ethyl]-4-(2-phenylethyl)-1,2,5,6-tetrahydropyridine and 1-[2-(2-acetoxymethyl-3-indolyl)ethyl]-4-(2-phenylethyl)
piperidine;
(O) 1-[2-(2-acetoxymethyl-5,6-dimethoxy-3-indoyly)
ethyl]-4-benzyl-1,2,5,6-tetrahydropyridine and 1-[2-(2-acetoxymethyl-5,6-dimethoxy-3-indolyl)ethyl]-4-benzylpiperidine;
(P) 1-[2-(2-acetoxymethyl-5,6-dimethoxy-3-indolyl)
ethyl]-4-phenyl-1,2,5,6-tetrahydropyridine and 1-[2-(2-acetoxymethyl-5,6-dimethoxy-3-indolyl)ethyl]-4-phenylpiperidine;
(Q) 1-[2-(2-acetoxymethyl-5,6-dimethoxy-3-indolyl)
ethyl]-4-(4-hydroxyphenyl)-1,2,5,6-tetrahydropyridine and 1-[2-(2-acetoxymethyl-5,6-dimethoxy-3-indolyl)ethyl]-4-(4-hydroxyphenyl)piperidine;
(R) 1-[2-(2-acetoxymethyl-5-methylsulfinyl-3-indolyl)ethyl]-4-phenyl-1,2,5,6-tetrahydropyridine and 1-[2-(2-acetoxymethyl-5-methylsulfinyl-3-indolyl)ethyl]-4-phenylpiperidine;
(S) 1-[2-(2-acetoxymethyl-5-methylsulfonyl-3-indolyl)ethyl]-4-phenyl-1,2,5,6-tetrahydropyridine and 1-[2-(2-acetoxymethyl-5-methylsulfonyl-3-indolyl)ethyl]-4-phenylpiperidine;
(T) 1-[2-(2-acetoxymethyl-5-trifluoromethyl-3-indolyl)ethyl]-4-(4-methylsulfinylphenyl)-1,2,5,6-tetrahydropyridine and 1-[2-(2-acetoxymethyl-5-trifluoromethyl-3-indolyl)ethyl]-4-(4-methylsulfinylphenyl)piperidine;
(U) 1-[2-(2-acetoxymethyl-3-indolyl)ethyl]-4-(4-methylsulfinylphenyl)-1,2,5,6-tetrahydropyridine and 1-[2-(2-acetoxymethyl-3-indolyl)ethyl]-4-(4-methylsulfinylphenyl)piperidine;
(V) 1-[2-(2-acetoxymethyl-3-indolyl)ethyl]-4-(3,4-methylenedioxyphenyl)-1,2,5,6-tetrahydropyridine and 1-[2-(2-acetoxymethyl-3-indolyl)ethyl]-4-(3,4-methylenedioxyphenyl)piperidine; and
(W) 1-[2-(2-acetoxymethyl-3-indolyl)ethyl]-4-(3,4-ethylenedioxyphenyl)-1,2,5,6-tetrahydropyridine and 1-[2-(2-acetoxymethyl-3-indolyl)ethyl]-4-(3,4-ethylenedioxyphenyl)piperidine.

EXAMPLE 9

1 - [2-(2-formyl-5,6-dimethoxy-3-indolyl)ethyl]-4-phenyl-1,2,5,6-tetrahydropyridine By reaction of 1 - [2-[2-(2-carboxy-5,6-dimethoxy-3-indolyl)ethyl]-4-phenyl-1,2,5,6 - tetrahydropyridine with thionyl chloride in an organic solvent, for example toluene, and reduction of the resulting 1-[2-(2-chloroformyl-5,6-dimethoxy - 3 - indolyl)ethyl] - 4 - phenyl-1,2,5,6-tetrahydropyridine with tri-t-butoxy lithium aluminum hydride, there can be obtained 1-[2-(2-formyl-5,6-dimethoxy - 3 - indolyl)ethyl] - 4 - phenyl-1,2,5,6-tetrahydropyridine.

Similarly, reaction of 1-[2-(2-carboxy-5,6-dimethoxy-3-indolyl)ethyl]-4-phenylpiperidine with thionyl chloride and reduction of the resulting 2-chloroformyl compound with tri-t-butoxy lithium aluminum hydride affords 1-[2-(2 - formyl-5,6-dimethoxy - 3 - indolyl)ethyl]-4-phenylpiperidine.

EXAMPLE 10

By reaction of the compounds described above in Example 4 with thionyl chloride, and reduction of the resulting 2 - chloroformyl compounds with tri-t-butoxy lithium aluminum hydride, all according to the procedure described above in Example 9, there can be obtained the following respective compounds of Formula I where $R_2$ in each instance is CHO:

(A) 1-[2-(2-formyl-5,6-dimethoxy - 3 - indolyl)ethyl]-4-(2-methoxyphenyl)-1,2,5,6-tetrahydropyridine and 1-[2-(2-formyl-5,6-dimethoxy-3-indolyl)ethyl]-4-(2-methoxyphenyl)piperidine;
(B) 1-[2-(2-formyl-5-ethoxy-6-methoxy-3-indolyl)ethyl]-4-(4-methoxyphenyl)-1,2,5,6-tetrahydropyridine and 1-[2-(2-formyl-5-ethoxy-6-methoxy-3-indolyl)-ethyl]-4-(4-methoxyphenyl)piperidine;
(C) 1-[2-(2-formyl-4-methoxy-3-indolyl)ethyl]-4-(4-chlorophenyl)-1,2,5,6-tetrahydropyridine and 1-[2-(2-formyl-4-methoxy-3-indolyl)ethyl]-4-(4-chlorophenyl)piperidine;
(D) 1-[2-(2-formyl-7-methoxy-3-indolyl)ethyl]-4-(3,4-dimethoxyphenyl)-1,2,5,6-tetrahydropyridine and 1-[2-(2-formyl-7-methoxy-3-indolyl)ethyl]-4-(3,4-dimethoxyphenyl)piperidine;
(E) 1-[2-(2-formyl-5-methyl-3-indolyl)ethyl]-4-(2-methoxy 5-chlorophenyl)-1,2-5,6-tetrahydropyridine and 1-[2-(2-formyl-5-methyl-3-indolyl)ethyl]-4-(2-methoxy-5-chlorophenyl)piperidine;
(F) 1-[2-(2-formyl-4-chloro-3-indolyl)ethyl]-4-(2-methyl-3-chlorophenyl)-1,2,5,6-tetrahydropyridine and 1-[2-(2-formyl-4-chloro-3-indolyl)ethyl]-4-(2-methyl-3-chlorophenyl)piperidine;
(G) 1-[2-(2-formyl-5-fluoro-3-indolyl)ethyl]-4-(3-methylbenzyl)-1,2,5,6-tetrahydropyridine and
1-[2-(2-formyl-5-fluoro-3-indolyl)ethyl]-4-(3-methylbenzyl)piperidine;
(H) 1-[2-(2-formyl-5,6-methylenedioxy-3-indolyl)ethyl]-4-(2,6-dimethylphenyl)-1,2,5,6-tetrahydropyridine and 1-[2-(2-formyl-5,6-methylenedioxy-3-indolyl)ethyl]-4-(2,6-dimethylphenyl)piperidine;
(I) 1-[2-(2-formyl-5,6-ethylenedioxy-3-indolyl)ethyl]-4-[2-(4-fluorophenyl)ethyl]-1,2,5,6-tetrahydropyridine and 1-[2-(2-formyl-5,6-ethylenedioxy-3-indolyl)ethyl]-4-[2-(4-fluorophenyl)ethyl]piperidine;
(J) 1-[2-(2-formyl-5-benzyloxy-3-indolyl)ethyl]-4-[2-(3-trifluoromethylphenyl)ethyl]-1,2,5,6-tetrahydropyridine and 1-[2-(2-formyl-5-benzyloxy-3-indolyl)ethyl]-4-[2-(3-trifluoromethylphenyl)ethyl]piperidine;
(K) 1-[2-(2-formyl-5-hydroxy-3-indolyl)ethyl]-4-(2-methylmercaptophenyl)-1,2,5,6-tetrahydropyridine and 1-[2-(2-formyl-5-hydroxy-3-indolyl)ethyl]-4-(2-methylmercaptophenyl)piperidine;
(L) 1-[2-(2-formyl-5-methylmercapto-3-indolyl)ethyl]-4-(4-chlorobenzyl)-1,2,5,6-tetrahydropyridine and 1-[2-(2-formyl-5-methylmercapto-3-indolyl)ethyl]-4-(4-chlorobenzyl)piperidine;
(M) 1-[2-(2-formyl-6-chloro-7-methyl-3-indolyl)ethyl]-4-phenyl-1,2,5,6-tetrahydropyridine and 1-[2-(2-formyl-6-chloro-7-methyl-3-indolyl)ethyl]-4-phenylpiperidine;
(N) 1-[2-(2-formyl-3-indolyl)ethyl]-4-(2-phenylethyl)-1,2,5,6-tetrahydropyridine and 1-[2-(2-formyl-3-indolyl)ethyl]-4-(2-phenylethyl)piperidine;
(O) 1-[2-(2-formyl-5,6-dimethoxy-3-indolyl)ethyl]-4-benzyl-1,2,5,6-tetrahydropyridine and 1-[2-(2-formyl-5,6-dimethoxy-3-indolyl)ethyl]-4-benzylpiperidine;
(P) 1-[2-(2-formyl-5,6-dimethoxy-3-indolyl)ethyl]-4-phenyl-1,2,5,6-tetrahydropyridine and 1-[2-(2-formyl-5,6-dimethoxy-3-indolyl)ethyl]-4-phenylpiperidine;
(Q) 1-[2-(2-formyl-5,6-dimethoxy-3-indolyl)ethyl]-4-(4-hydroxyphenyl)-1,2,5,6-tetrahydropyridine and 1-[2-(2-formyl-5,6-dimethoxy-3-indolyl)ethyl]-4-(4-hydroxyphenyl)piperidine;
(R) 1-[2-(2-formyl-5-methylsulfinyl-3-indolyl)ethyl]-4-phenyl-1,2,5,6-tetrahydropyridine and 1-[2-(2-formyl-5-methylsulfinyl-3-indolyl)ethyl]-4-phenylpiperidine;
(S) 1-[2-(2-formyl-5-methylsulfonyl-3-indolyl)ethyl]-4-phenyl-1,2,5,6-tetrahydropyridine and 1-[2-(2-formyl-5-methylsulfonyl-3-indolyl)ethyl]-4-phenylpiperidine;
(T) 1-[2-(2-formyl-5-trifluoromethyl-3-indolyl)ethyl]-4-(4-methylsulfinylphenyl)-1,2,5,6-tetrahydropyridine and 1-[2-(2-formyl-5-trifluoromethyl-3-indolyl)ethyl]-4-(4-methylsulfinylphenyl)piperidine;
(U) 1-[2-(2-formyl-3-indolyl)ethyl]-4-(4-methylsulfinylphenyl)-1,2,5,6-tetrahydropyridine and 1-[2-(2-formyl-3-indolyl)ethyl]-4-(4-methylsulfinylphenyl)piperidine;
(V) 1-[2-(2-formyl-3-indolyl)ethyl]-4-(3,4-methylenedioxyphenyl)-1,2,5,6-tetrahydropyridine and 1-[2-(2-formyl-3-indolyl)ethyl]-4-(3,4-methylenedioxyphenyl)piperidine; and
(W) 1-[2-(2-formyl-3-indolyl)ethyl]-4-(3,4-ethylenedioxyphenyl)-1,2,5,6-tetrahydropyridine and 1-[2-(2-formyl-3-indolyl)ethyl]-4-(3,4-ethylenedioxyphenyl)piperidine.

EXAMPLE 11

1 - [2-(2-isonitrosomethylene-5,6-dimethoxy-3-indolyl)ethyl]-4-phenyl-1,2,5,6-tetrahydropyridine is prepared by reaction of 1-[2-(2-formyl-5,6-dimethoxy-3-indolyl)ethyl]-4-phenyl-1,2,5,6-tetrahydropyridine with hydroxylamine in ethanol in the presence of a small amount of hydrochloric acid.

Similarly, reaction of 1-[2-(2-formyl-5,6-dimethoxy-3-indolyl)ethyl]-4-phenylpiperidine with hydroxylamine in ethanol in the presence of a small amount of hydrochloric acid affords 1-[2-(2-isonitrosomethylene-5,6-dimethoxy-3-indolyl)ethyl]-4-phenylpiperidine.

EXAMPLE 12

By reaction of the compounds described in Example 10 with hydroxylamine, using the procedure described above in Example 11, there can be obtained the following respective compounds of Formula I where $R_2$ in each instance is isonitrosomethylene (CH=NOH):

(A) 1-[2-(2-isonitrosomethylene-5,6-dimethoxy - 3 - indolyl)ethyl]-4-(2-methoxyphenyl)-1,2,5,6-tetrahydropyridine and 1-[2-(2-isonitrosomethylene-5,6-dimethoxy-3-indolyl)ethyl]-4-(2-methoxyphenyl)piperidine;

(B) 1-[2-(2-isonitrosomethylene-5-ethoxy-6-methoxy-3-indolyl)ethyl]-4-(4-methoxyphenyl)-1,2,5,6-tetrahydropyridine and 1-[2-(2-isonitrosomethylene-5-ethoxy-6-methoxy-3-indolyl)ethyl]-4-(4-methoxyphenyl)piperidine;

(C) 1-[2-(2-isonitrosomethylene-4-methoxy-3-indolyl)ethyl]-4-(4-chlorophenyl)-1,2,5,6-tetrahydropyridine and 1-[2-(2-isonitrosomethylene-4-methoxy-3-indolyl)ethyl]-4-(4-chlorophenyl)piperidine;

(D) 1-[2-(2-isonitrosomethylene-7-methoxy-3-indolyl)-ethyl]-4-(3,4-dimethoxyphenyl)-1,2,5,6-tetrahydropyridine and 1-[2-(2-isonitrosomethylene-7-methoxy-3-indolyl)ethyl]-4-(3,4-dimethoxyphenyl)piperidine;

(E) 1-[2-(2-isonitrosomethylene-5-methyl-3-indolyl)ethyl]-4-(2-methoxy-5-chlorophenyl)-1,2,5,6-tetrahydropyridine and 1-[2-(2-isonitrosomethylene-5-methyl-3-indolyl)ethyl]-4-(2-methoxy-5-chlorophenyl)piperidine;

(F) 1-[2-isonitrosomethylene-4-chloro-3-indolyl)ethyl]-4-(2-methyl-3-chlorophenyl)-1,2,5,6-tetrahydropyridine and 1-[2-(2-isonitrosomethylene-4-chloro-3-indolyl)ethyl]-4-(2-methyl-3-chlorophenyl)piperidine;

(G) 1-[2-(2-isonitrosomethylene-5-fluoro-3-indolyl)ethyl]-4-(3-methylbenzyl)-1,2,5,6-tetrahydropyridine and 1-[2-(2-isonitrosomethylene-5-fluoro-3-indolyl)ethyl]-4-(3-methylbenzyl)piperidine;

(H) 1-[2-(2-isonitrosomethylene-5,6-methylenedioxy-3-indolyl)ethyl]-4-(2,6-dimethylphenyl)-1,2,5,6-tetrahydropyridine and 1-[2-(2-isonitrosomethylene-5,6-methylenedioxy-3-indolyl)ethyl]-4-(2,6-dimethylphenyl)piperidine;

(I) 1-[2-(2-isonitrosomethylene-5,6-ethylenedioxy-3-indolyl)ethyl]-4-[2-(4-fluorophenyl)ethyl]-1,2,5,6-tetrahydropyridine and 1-[2-(2-isonitrosomethylene-5,6-ethylenedioxy-3-indolyl)ethyl]-4-[2-(4-fluorophenyl)ethyl]piperidine;

(J) 1-[2-(2-isonitrosomethylene-5-benzyloxy-3-indolyl)ethyl]-4-[2-(3-trifluoromethylphenyl)ethyl]-1,2,5,6-tetrahydropyridine and 1-[2-(2-isonitrosomethylene-5-benzyloxy-3-indolyl)ethyl]-4-[2-(3-trifluoromethylphenyl)ethyl]piperidine;

(K) 1-[2-(2-isonitrosomethylene-5-hydroxy-3-indolyl)-ethyl]-4-(2-methylmercaptophenyl)-1,2,5,6-tetrahydropyridine and 1-[2-(2-isonitrosomethylene-5-hydroxy-3-indolyl)ethyl]-4-(2-methylmercaptophenyl)piperidine;

(L) 1-[2-(2-isonitrosomethylene-5-methylmercapto-3-indolyl)ethyl]-4-(4-chlorobenzyl)-1,2,5,6-tetrahydropyridine and 1-[2-(2-isonitrosomethylene-5-methylmercapto-3-indolyl)ethyl]-4-(4-chlorobenzyl)piperidine;

(M) 1-[2-(2-isonitrosomethylene-6-chloro-7-methyl-3-indolyl)ethyl]-4-phenyl-1,2,5,6-tetrahydropyridine and 1-[2-(2-isonitrosomethylene-6-chloro-7-methyl-3-indolyl)ethyl]-4-phenylpiperidine;

(N) 1-[2-(2-isonitrosomethylene-3-indolyl)ethyl]-4-(2-phenylethyl)-1,2,5,6-tetrahydropyridine and 1-[2-(2-isonitrosomethylene-3-indolyl)ethyl]-4-(2-phenylethyl)piperidine;

(O) 1-[2-(2-isonitrosomethylene-5,6-dimethoxy-3-indolyl)ethyl]-4-benzyl-1,2,5,6-tetrahydropyridine and 1-[2-(2-isonitrosomethylene-5,6-dimethoxy-3-indolyl)ethyl]-4-benzylpiperidine;

(P) 1-[2-(2-isonitrosomethylene-5,6-dimethoxy-3-indolyl)ethyl]-4-phenyl-1,2,5,6-tetrahydropyridine and 1-[2-(2-isonitrosomethylene-5,6-dimethoxy-3-indolyl)ethyl]-4-phenylpiperidine;

(Q) 1-[2-(2-isonitrosomethylene-5,6-dimethoxy-3-indolyl)ethyl]-4-(4-hydroxyphenyl)-1,2,5,6-tetrahydropyridine and 1-[2-(2-isonitrosomethylene-5,6-dimethoxy-3-indolyl)ethyl]-4-(4-hydroxyphenyl)piperidine;

(R) 1-[2-(2-isonitrosomethylene-5-methylsulfinyl-3-indolyl)ethyl]-4-phenyl-1,2,5,6-tetrahydropyridine and 1-[2-(2-isonitrosomethylene-5-methylsulfinyl-3-indolyl)ethyl]-4-phenylpiperidine;

(S) 1-[2-(2-isonitrosomethylene-5-methylsulfonyl-3-indolyl)ethyl]-4-phenyl-1,2,5,6-tetrahydropyridine and 1-[2-(2-isonitrosomethylene-5-methylsulfonyl-3-indolyl)ethyl]-4-phenylpiperidine;

(T) 1-[2-(2-isonitrosomethylene-5-trifluoromethyl-3-indolyl)ethyl]-4-(4-methylsulfinylphenyl)-1,2,5,6-tetrahydropyridine and 1-[2-(2-isonitrosomethylene-5-trifluoromethyl-3-indolyl)ethyl]-4-(4-methylsulfinylphenyl)piperidine;

(U) 1-[2-(2-isonitrosomethylene-3-indolyl)ethyl]-4-(4-methylsulfinylphenyl)-1,2,5,6-tetrahydropyridine and 1-[2-(2-isonitrosomethylene-3-indolyl)ethyl]-4-(4-methylsulfinylphenyl)piperidine;

(V) 1-[2-(2-isonitrosomethylene-3-indolyl)ethyl]-4-(3,4-methylenedioxyphenyl)-1,2,5,6-tetrahydropyridine and 1-[2-(2-isonitrosomethylene-3-indolyl)ethyl]-4-(3,4-methylenedioxyphenyl)piperidine; and (W) 1-[2-(2-isonitrosomethylene-3-indolyl)ethyl]-4-(3,4-ethylenedioxyphenyl)-1,2,5,6-tetrahydropyridine and 1-[2-(2-isonitrosomethylene-3-indolyl)ethyl]-4-(3,4-ethylenedioxyphenyl)piperidine.

EXAMPLE 13

1 - [2 - (2 - carbamyl-5,6 - dimethoxy - 3 - indolyl) ethyl] - 4 - phenyl - 1,2,5,6 - tetrahydropyridine is prepared by reaction of 1-[2-(2-carboxy-5,6-dimethoxy-3-indolyl)ethyl] - 4 - phenyl - 1,2,5,6-tetrahydropyridine with thionyl chloride in toluene, and reaction of the resulting 2-chloroformyl compound with anhydrous ammonia.

Similarly, reaction of 1-[2-(2-carboxy-5,6-dimethoxy-3-indolyl)ethyl]-4-phenylpiperidine with thionyl chloride and reaction of the resulting 2-chloroformyl compound with anhydrous ammonia, affords 1-[2-(2-carbamyl-5,6-dimethoxy-3-indolyl)ethyl]-4-phenylpiperidine.

EXAMPLE 14

By reacting the compounds described above in Example 4 with thionyl chloride, and reacting the resulting 2-chloroformyl compounds with anhydrous ammonia, N-methylamine, or N,N-dimethylamine, all according to the procedure described above in Example 13, there can be obtained the following respective compounds of Formula I where $R_2$ is carbamyl ($CONH_2$), N-methylcarbamyl ($CONHCH_3$), or N,N-dimethylcarbamyl [$CON(CH_3)_2$]:

(A) 1-[2-(2-carbamyl-5,6-dimethoxy-3-indolyl)ethyl]-4-(2-methoxyphenyl)-1,2,5,6-tetrahydropyridine and 1-[2-(2-carbamyl-5,6-dimethoxy-3-indolyl)ethyl]-4-(2-methoxyphenyl)piperidine ($R_2$ is $CONH_2$);

(B) 1-{2-[2-(N-methylcarbamyl)-5-ethoxy-6-methoxy-3-indolyl]ethyl}-4-(4-methoxyphenyl)-1,2,5,6-tetrahydropyridine and 1-{2-[2-(N-methylcarbamyl)-5-ethoxy-6-methoxy-3-indolyl]ethyl}-4-(4-methoxyphenyl)piperidine ($R_2$ is $CONHCH_3$);

(C) 1-{2-[2-(N,N-dimethylcarbamyl)-4-methoxy-3-indolyl]ethyl}-4-(4-chlorophenyl)-1,2,5,6-tetrahydropyridine and 1-{2-[2-(N,N-dimethylcarbamyl)-4- methoxy-3-indolyl]ethyl}-4-(4-chlorophenyl)piperidine [R₂ is CON(CH₃)₂];
(D) 1-[-(2-carbamyl-7-methoxy-3-indolyl)ethyl]-4-(3,4-dimethoxyphenyl)-1,2,5,6-tetrahydropyridine and 1-[2-(2-carbamyl-7-methoxy-3-indolyl)ethyl]-4-(3,4-dimethoxyphenyl)piperidine (R₂ is CONH₂);
(E) 1-{2-[2-(N-methylcarbamyl)-5-methyl-3-indolyl]ethyl}-4-(2-methoxy-5-chlorophenyl)-1,2,5,6-tetrahydropyridine and 1-{2-[2-(N-methylcarbamyl)-5-methyl-3-indolyl]ethyl}-4-(2-methoxy-5-chlorophenyl)piperidine (R₂ is CONHCH₃);
(F) 1-{2-[2-(N,N-dimethylcarbamyl)-4-chloro-3-indolyl]ethyl}-4-(2-methyl-3-chlorophenyl)-1,2,5,6-tetrahydropyridine and 1-{-[2-(N,N-dimethylcarbamyl)-4-chloro-3-indolyl]ethyl}-4-(2-methyl-3-chlorophenyl)piperidine [R₂ is CON(CH₃)₂];
(G) 1-[2-(2-carbamyl-5-fluoro-3-indolyl)ethyl]-4-(3-methylbenzyl)-1,2,5,6-tetrahydropyridine and 1-[2-(2-carbamyl-5-fluoro-3-indolyl)ethyl]-4-(3-methylbenzyl)piperidine (R₂ is CONH₂);
(H) 1-{2-[2-(N-methylcarbamyl)-5,6-methylenedioxy-3-indolyl]ethyl}-4-(2,6-dimethylphenyl)-1,2,5,6-tetrahydropyridine and 1-{2-[2-(N-methylcarbamyl)-5,6-methylenedioxy-3-indolyl]ethyl}-4-(2,6-dimethylphenyl)piperidine (R₂ is CONHCH₃);
(I) 1-{2-[2-(N,N-dimethylcarbamyl)-5,6-ethylenedioxy-3-indolyl]ethyl}-4-[2-(4-fluorophenyl)ethyl]-1,2,5,6-tetrahydropyridine and 1-{2-[2-(N,N-dimethylcarbamyl)-5,6-ethylenedioxy-3-indolyl]ethyl}-4-[2-(4-fluorophenyl)ethyl]piperidine [R₂ is CON(CH₃)₂];
(J) 1-[2-(2-carbamyl-5-benzyloxy-3-indolyl)ethyl]-4-[2-(3-trifluoromethylphenyl)ethyl]-1,2,5,6-tetrahydropyridine and 1-[2-(2-carbamyl-5-benzyloxy-3-indolyl)ethyl]-4-[2-(3-trifluoromethylphenyl)ethyl]piperidine (R₂ is CONH₂);
(K) 1-{2-[2-(N-methylcarbamyl)-5-hydroxy-3-indolyl]ethyl}-4-(2-methylmercaptophenyl)-1,2,5,6-tetrahydropyridine and 1-{2-[2-(N-methylcarbamyl)-5-hydroxy-3-indolyl]ethyl}-4-(2-methylmercaptophenyl)piperidine (R₂ is CONHCH₃);
(L) 1-{2-[2-(N,N-dimethylcarbamyl)-5-methylmercapto-3-indolyl]ethyl}-4-(4-chlorobenzyl)-1,2,5,6-tetrahydropyridine and 1-{2-[2-(N,N-dimethylcarbamyl)-5-methylmercapto-3-indolyl]ethyl}-4-(4-chlorobenzyl)piperidine [R₂ is CON(CH₃)₂];
(M) 1-[2-(2-carbamyl-6-chloro-7-methyl-3-indolyl)ethyl]-4-phenyl-1,2,5,6-tetrahydropyridine and 1-[2-(2-carbamyl-6-chloro-7-methyl-3-indolyl)ethyl]-4-phenylpiperidine (R₂ is CONH₂);
(N) 1-{2-[2-(N-methylcarbamyl)-3-indolyl]ethyl}-4-(2-phenylethyl)-1,2,5,6-tetrahydropyridine and 1-{2-[2-(N-methylcarbamyl)-3-indolyl]ethyl}-4-(2-phenylethyl)piperidine (R₂ is CONHCH₃);
(O) 1-{2-[2-(N,N-dimethylcarbamyl)-5,6-dimethoxy-3-indolyl]ethyl}-4-benzyl-1,2,5,6-tetrahydropyridine and 1-{2-[2-(N,N-dimethylcarbamyl)-5,6-dimethoxy-3-indolyl]ethyl}-4-benzylpiperidine [R₂ is CON(CH₃)₂];
(P) 1-[2-(2-carbamyl-5,6-dimethoxy-3-indolyl)ethyl]-4-phenyl-1,2,5,6-tetrahydropyridine and 1-[2-(2-carbamyl-5,6-dimethoxy-3-indolyl)ethyl]-4-phenylpiperidine (R₂ is CONH₂);
(Q) 1-{2-[2-(N-methylcarbamyl)-5,6-dimethoxy-3-indolyl]ethyl}-4-(4-hydroxyphenyl)-1,2,5,6-tetrahydropyridine and 1-{2-[2-(N-methylcarbamyl)-5,6-dimethoxy-3-indolyl]ethyl}-4-(4-hydroxyphenyl)piperidine (R₂ is CONHCH₃);
(R) 1-{2-[2-(N,N-dimethylcarbamyl)-5-methylsulfinyl-3-indolyl]ethyl}-4-phenyl-1,2,5,6-tetrahydropyridine and 1-{2-[2-(N,N-dimethylcarbamyl)-5-methylsulfinyl-3-indolyl]ethyl}-4-phenylpiperidine [R₂ is CON(CH₃)₂];
(S) 1-[2-(2-carbamyl-5-methylsulfonyl-3-indolyl)ethyl]-4-phenyl-1,2,5,6-tetrahydropyridine and 1-[2-(2-carbamyl-5-methylsulfonyl-3-indolyl)ethyl]-4-phenylpiperidine (R₂ is CONH₂);
(T) 1-{2-[2-(N-methylcarbamyl)-5-trifluoromethyl-3-indolyl]ethyl}-4-(4-methylsulfinylphenyl)-1,2,5,6-tetrahydropyridine and 1-{2-[2-(N-methylcarbamyl)-5-trifluoromethyl-3-indolyl]ethyl}-4-(4-methylsulfinylphenyl)piperidine (R₂ is CONHCH₃);
(U) 1-{2-[2-(N,N-dimethylcarbamyl)-3-indolyl]ethyl}-4-(4-methylsulfinylphenyl)-1,2,5,6-tetrahydropyridine and 1-{2-[2-(N,N-dimethylcarbamyl)-3-indolyl]ethyl}-4-(4-methylsulfinylphenyl)piperidine [R₂ is CON(CH₃)₂];
(V) 1-[2-(2-carbamyl-3-indolyl)ethyl]-4-(3,4-methylenedioxyphenyl)-1,2,5,6-tetrahydropyridine and 1-[2-(2-carbamyl-3-indolyl)ethyl]-4-(3,4-methylenedioxyphenyl)piperidine (R₂ is CONH₂); and
(W) 1-{2-[2-(N-methylcarbamyl)-3-indolyl]ethyl}-4-3,4-ethylenedioxyphenyl)-1,2,5,6-tetrahydropyridine and 1-{2-[2-(N-methylcarbamyl)-3-indolyl]ethyl}-4-(3,4-ethylenedioxyphenyl)piperidine (R₂ is CONHCH₃).

I claim:
1. A compound having the formula

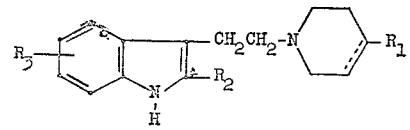

where R₁ is phenyl or phenyl-lower-alkyl; R₂ is carbo-lower-alkoxy, carboxy, hydroxymethyl, lower-alkanoyloxymethyl, carbamyl, N-lower-alkylcarbamyl, N,N-di-lower-alkylcarbamyl, formyl, or isonitrosomethylene, and alkali metal salts of compounds where R₂ is carboxy; R₃ is hydrogen or methylenedioxy or ethylenedioxy each attached to adjacent carbon atoms or one or two of the same or different members of the group consisting of halogen, lower-alkyl, lower-alkoxy, lower-alkylmercapto, lower alkylsulfinyl, lower-alkylsulfonyl, trifluoromethyl, benzyloxy, or hydroxy, and wherein the bond represented by the dotted line and the solid line together is either a saturated ethylene linkage or an unsaturated ethenylene linkage, and wherein the benzene ring of R₁ as phenyl or phenyl-lower-alkyl is unsubstituted or substituted by methylenedioxy or ethylenedioxy each attached to adjacent carbon atoms or by one or two of the same or different members of the group consisting of halogen, lower-alkyl, lower-alkoxy, lower-alkylmercapto, lower-alkylsulfinyl, lower-alkylsulfonyl, trifluoromethyl, or hydroxy.

2. A compound according to claim 1 wherein R₁ is phenyl; R₂ is carbo-lower-alkoxy; R₃ is di-lower-alkoxy; and the bond represented by the dotted line and the solid line together is an unsaturated ethenylene linkage.

3. 1 - [2 - (2 - carbethoxy-5,6-dimethoxy-3-indolyl) ethyl]-4-phenyl - 1,2,5,6 - tetrahydropyridine according to claim 2, wherein R₂ is carbethoxy; and R₃ is 5,6-dimethoxy.

References Cited
UNITED STATES PATENTS
3,182,071  5/1965  Shavel et al. _____ 260—319
3,238,215  3/1966  Zenitz _____ 260—294.7 G
3,475,437  10/1969  Landgraf et al. ____ 260—296 B FOREIGN PATENTS
42–2,708  2/1967  Japan _____ 260—294 A HENRY R. JILES, Primary Examiner
S. D. WINTERS, Assistant Examiner U.S. Cl. X.R.

424—267, 263; 260—294.3 E, 294.3 A, 294 D, 294 A, 294.7 G, 294.7 D, 293.4 R, 293.4 G, 294.8 C, 293 D, 297 B, 296 B, 326.12 R, 326.13 R, 343.5, 244 R, 290 H, 294.7 E, 294 S